US008588534B2

(12) United States Patent
He et al.

(10) Patent No.: US 8,588,534 B2
(45) Date of Patent: Nov. 19, 2013

(54) STAGED ELEMENT CLASSIFICATION

(75) Inventors: Yaming He, Redmond, WA (US); Chuang Gu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 256 days.

(21) Appl. No.: 13/102,740

(22) Filed: May 6, 2011

(65) Prior Publication Data
US 2012/0281886 A1    Nov. 8, 2012

(51) Int. Cl.
*G06K 9/68* (2006.01)
(52) U.S. Cl.
USPC .......................................................... 382/227
(58) Field of Classification Search
None
See application file for complete search history.

(56) References Cited

U.S. PATENT DOCUMENTS

| 6,754,675 | B2 | 6/2004 | Abdel-Mottaleb et al. |
| 6,813,365 | B1 | 11/2004 | Funahashi |
| 7,555,149 | B2 | 6/2009 | Peker et al. |
| 7,881,505 | B2 | 2/2011 | Schneiderman et al. |
| 2003/0079184 | A1 | 4/2003 | Berger et al. |
| 2008/0089561 | A1 | 4/2008 | Zhang |
| 2008/0298766 | A1* | 12/2008 | Wen et al. ...................... 386/46 |
| 2009/0154483 | A1 | 6/2009 | Qu |
| 2009/0245573 | A1 | 10/2009 | Saptharishi et al. |
| 2010/0103170 | A1 | 4/2010 | Baloch et al. |
| 2010/0226584 | A1 | 9/2010 | Weng et al. |
| 2011/0043437 | A1* | 2/2011 | Tang et al. ...................... 345/55 |
| 2011/0050959 | A1 | 3/2011 | Liu et al. |
| 2012/0039514 | A1* | 2/2012 | Sun et al. ...................... 382/118 |

OTHER PUBLICATIONS

Xiang, et al., "Range Image Segmentation Based on Split-Merge Clustering", Retrieved at <<http://ieeexplore.ieee.org/stamp/stamp.jsp?tp=&arnumber=1334604>>, In the Proceedings of the 17th International Conference on Pattern Recognition, vol. 3, Aug. 2004, pp. 4.

"International Search Report", Mailed Date: Nov. 14, 2012, Application No. PCT/US2012/036030, Filed Date: May 2, 2012, pp. 1-8.

* cited by examiner

*Primary Examiner* — Vikkram Bali
(74) *Attorney, Agent, or Firm* — Alleman Hall McCoy Russell & Tuttle LLP

(57) ABSTRACT

Various examples are disclosed herein that relate to staged element classification. For example, one disclosed example provides a method of classifying elements by forming elements for classification into a plurality of first-level sets in a first stage, generating primary groups within the first-level sets based on element similarity, forming a plurality of second-level sets from the first-level sets in a second stage, generating secondary groups within the second-level sets based on element similarity, and merging a plurality of the primary and/or secondary groups based on element similarity.

20 Claims, 9 Drawing Sheets

STAGED ELEMENT CLASSIFICATION

BACKGROUND

Classifying image elements in streaming media can improve interactive media experiences. However, performing the classification can be difficult. As one example, each face that is depicted in a digital video may be labeled with the name of the character that face belongs to and/or the actor that plays that character. However, there may be a very large number of faces to label in a typical digital video. For example, a ninety minute movie with a thirty-frames-per-second playback speed includes 162,000 frames; and each frame may include several faces. As such, a movie may include hundreds of thousands of faces to label.

SUMMARY

Similar elements are grouped together in two stages. In a first stage, all elements are formed into first level sets, and similar elements from each first level set are grouped together in primary groups. In a second stage, all elements are formed into second level sets, which are different than the first level sets. Similar elements from each second level set are grouped together in secondary groups. The primary groups and secondary groups that are similar are merged together.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Identifying and classifying informational elements encountered in everyday situations can enhance everyday lives, offering the ability to form connections among otherwise ephemeral objects and concepts. As an example, interactive entertainment experiences may be enhanced by identifying and classifying various elements within the entertainment content, potentially providing the user with opportunities to discover new content based on the classified elements. In one scenario, digital images from video content (e.g., a television show or a movie) may be analyzed to identify the faces of the actors at various points throughout the content. The user may be presented with an opportunity to skip to scenes including a favorite actor (or combination of actors), to access information about the actor and/or the character the actor is portraying from the Internet, and to identify related movies in which the actor or character appears, among other opportunities.

While some portion of the classification may be performed automatically, other portions may employ direct human participation. For example, a face identification routine may divide the movie into segments, analyze the digital images of each segment, find faces in those digital images, and prompt a human to label each face.

As described below, a staged classification approach may provide a desirable level of classification accuracy and precision while reducing a total number of faces for a human to label.

Figure 1:
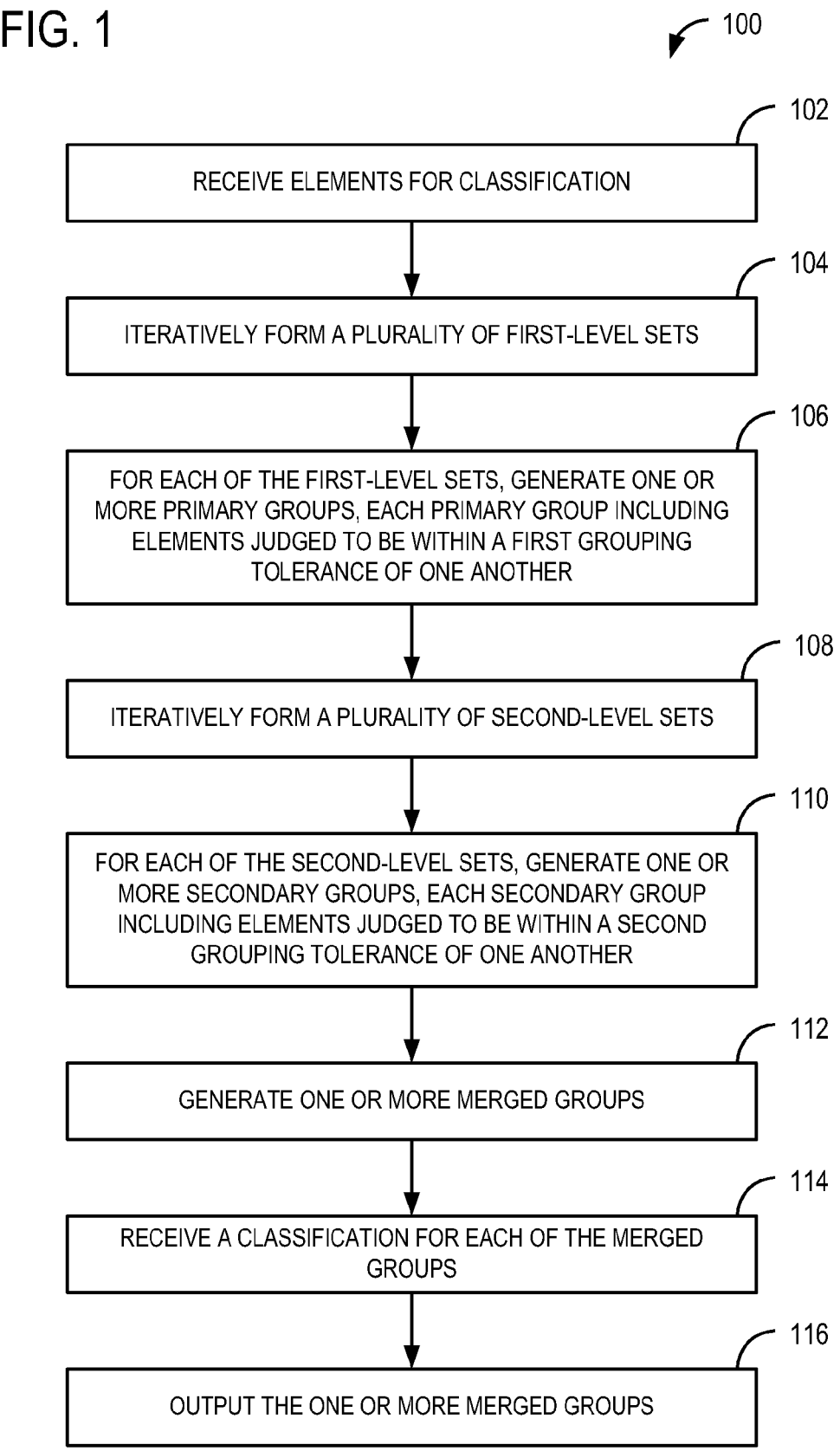
FIG. 1 shows a method of classifying elements into groups in accordance with an embodiment of the present disclosure.

FIG. 1 shows a method 100 of stagewise classifying elements into groups based on element similarity. It will be appreciated that method 100 may be used to classify any suitable collection of elements without departing from the scope of the present disclosure. For illustrative purposes, method 100 will be described below with reference to classifying human faces depicted in digital images. For example, each face included in each frame of a movie may be classified into a group such that the group includes only faces from the same actor.

At 102, method 100 comprises receiving elements for classification. In one non-limiting scenario, digital images of faces retrieved from a movie may be received for classification. However, it will be appreciated that the elements may be received from any suitable data stream and/or data store without departing from the scope of the present disclosure. Once received, the elements are processed and classified as described in more detail below.

In some embodiments, the elements received may include, directly or by reference to information in a separate data store, information related to the element (e.g., metadata). As one non-limiting example, a raw digital image depicting a human face may include time stamp and screen position data for the face embedded in the digital image.

At 104, method 100 comprises iteratively forming a plurality of first-level sets, each first-level set including up to a base number of elements. The base number represents a capacity value for the first-level sets. Once a particular first-level set is populated with the base number of elements, a new first-level set is formed and populated.

In some embodiments, the base number may be selected according to computational resources (for example, logic subsystem and/or data-holding subsystem capabilities), network traffic resources, or other suitable classification system characteristics. As an example, the digital images forming a movie may include 30,000 human faces. Without dividing the movie into a plurality of first-level sets, matching the faces with an identity would require performing a face comparison for each element of a 30,000×30,000 similarity matrix. Performing such a task may be computationally expensive relative to performing a comparison within twenty 1,500×1,500 similarity matrices resulting from a plurality of first-level sets having a base number of 1,500. It will be appreciated that the base number may be any suitable size, and that in some embodiments, the base number may vary over time in response to computational resources and/or various characteristics of the elements being classified, such as element size.

In some embodiments, all but the last of the first-level sets may include the base number of the elements while the last of the first-level sets includes the remainder of the elements. For example, if the total number of elements is 30,843, and the first-level set size is capped at 1,500 elements, then the first twenty first-level sets will each include 1,500 elements, while the last first-level set will include the remaining 843 elements. It will be appreciated that the elements may be populated within the first-level sets in any suitable manner without departing from the scope of the present disclosure.

Figure 2:
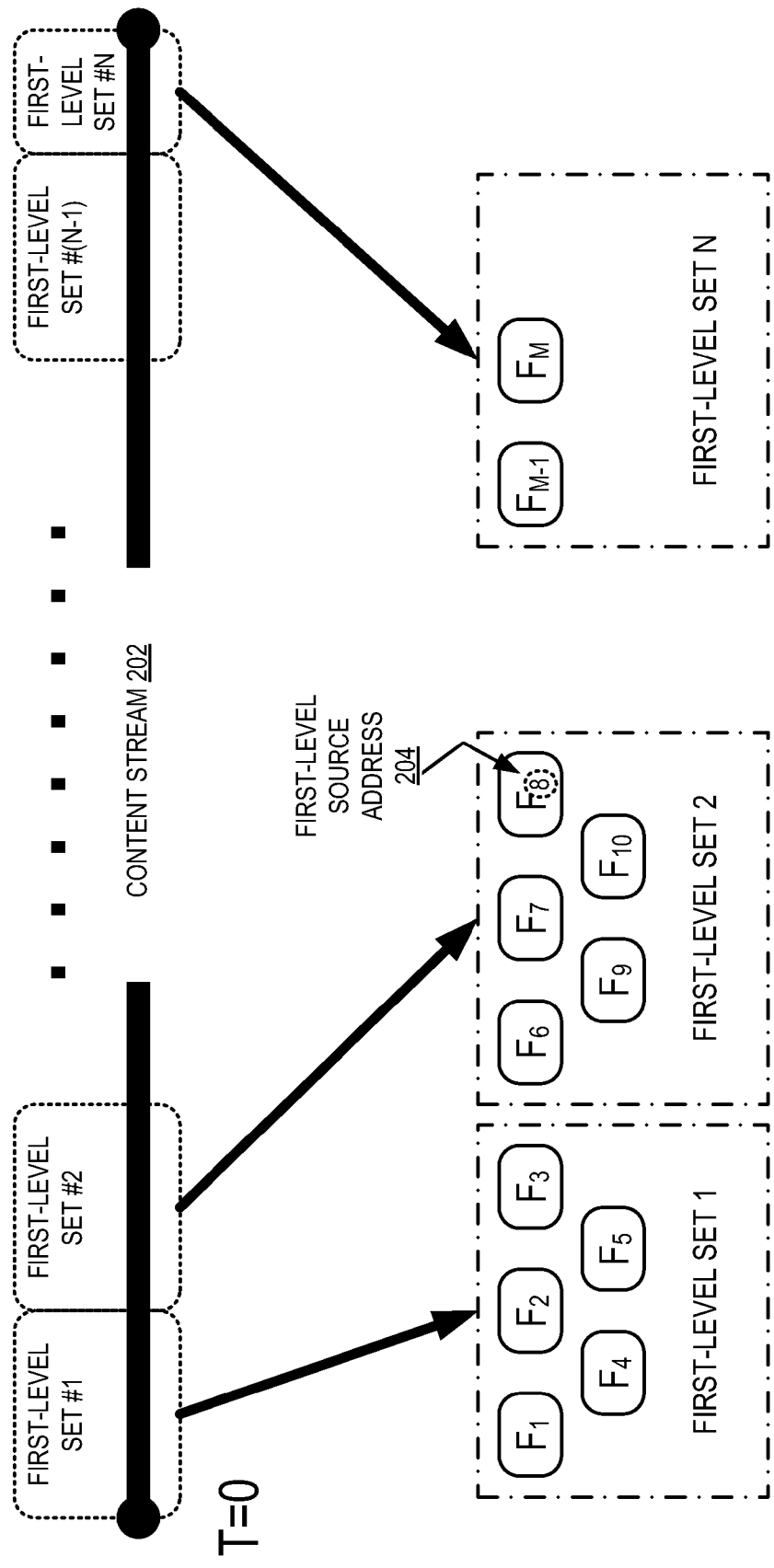
FIG. 2 schematically shows iteratively forming a plurality of first-level sets in accordance with an embodiment of the present disclosure.

FIG. 2 schematically shows forming a plurality of first-level sets of human faces depicted in digital images of a content stream 202. FIG. 2 shows N first-level sets used to classify M human faces included in content stream 202. As shown in FIG. 2, each of the first-level sets 1 through (N−1) are populated with a base number of human faces culled from digital images of content stream 202. The base number is arbitrarily set at five in the example shown in FIG. 2. Thus, first-level set 1 includes the first five elements (faces $F_1$ through $F_5$), first-level set 2 includes the next five elements (faces $F_6$ through $F_{10}$), and so on, until all of the first-level sets are formed and populated. In the example shown in FIG. 2, the last first-level set (labeled first-level set N) includes the remaining two elements (faces $F_{M-1}$ and $F_M$).

As shown in FIG. 2, each of the elements may be labeled with a first-level source address 204 particularly indicating a relative position within content stream 202 that that particular element is located.

Turning back to FIG. 1, method 100 includes, at 106, for each of the plurality of first-level sets, generating one or more primary groups for that first-level set. Each primary group includes elements judged to be similar to one another according to one or more predetermined characteristics. Put another way, each primary group includes elements from that first-level set judged to be within a first grouping tolerance of one another. It will be understood that the number of primary groups may vary among the first-level sets. A primary group may include all of the elements of a first-level set if all of the elements are judged to be within the first grouping tolerance of one another; a primary group may include a plurality of elements judged to be within the first grouping tolerance of one another; or a primary group may include a single element.

Figure 3:
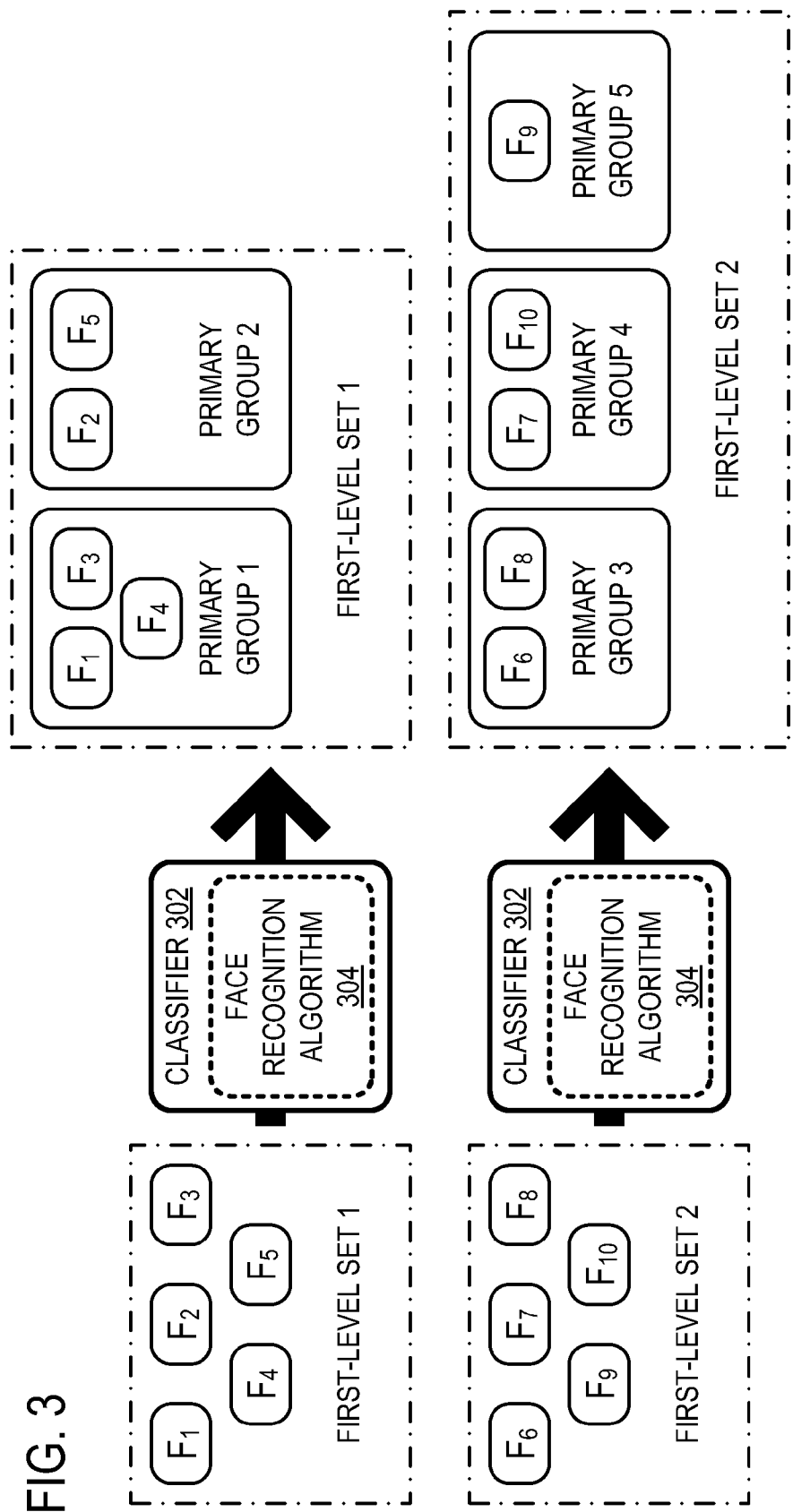
FIG. 3 schematically shows generating one or more primary groups for a plurality of first-level sets in accordance with an embodiment of the present disclosure.

Continuing with the example of FIG. 2, FIG. 3 schematically shows generating one or more primary groups for first-level set 1 and first-level set 2. While it is not shown in FIG. 3, it will be appreciated that the embodiment shown in FIG. 3 could be performed on the other first-level sets introduced in FIG. 2 so that primary groups may be generated for each first-level set formed from content stream 202.

In the context of the face classification example introduced above, each primary group includes digital images from that first-level set judged to be within a first grouping tolerance of one another. As shown in FIG. 3, classifier 302 compares the faces in first-level set 1, forming primary group 1 (including faces $F_1$, $F_3$, and $F_4$) and primary group 2 (including faces $F_2$ and $F_5$). Classifier 302 also forms primary group 3 (including faces $F_6$ and $F_8$), primary group 4 (including faces $F_7$ and $F_{10}$), and primary group 5 (including face $F_9$) by comparing the faces in first-level set 2.

Judgment regarding element similarity may be made in any suitable way, and such judgments may vary depending on the kind and type of element being classified. For example, judgment parameters related to classifying the identity of a human face in an image may differ from judgment parameters related to classifying meanings for words. Continuing with the face identification example described above, FIG. 3 shows classifier 302 employing a face recognition algorithm 304 configured to recognize and classify human faces included in the digital images. Thus, face recognition algorithm 304 judges whether a human face depicted within a digital image is within the first grouping tolerance relative to a human face depicted within another digital image. The first grouping tolerance may be configured so that a pair of faces will be judged to belong to a common primary group according to facial characteristic similarity parameters (such as eye spacing, brow depth, etc.) between a human face depicted within one element of the pair of elements and a human face depicted within the other element of the pair of elements.

Turning back to FIG. 1, method 100 includes, at 108, iteratively forming a plurality of second-level sets by, for each second-level set, sequentially selecting a next available element from a next available primary group until that second-level set includes the base number of elements or until no next available element remains. In other words, formation of the second-level sets proceeds by selecting elements spanning the various primary groups, so that a newly-formed second-level set may include representative elements from a plurality of primary groups. Thus, a subsequent stage of element classification (described in more detail below) may potentially be performed with a greater variety of elements relative to performing a second stage of classification for serially-selected elements, so that the resulting groupings may be comparatively more effective at discriminating among diverse and similar elements.

Figure 4:
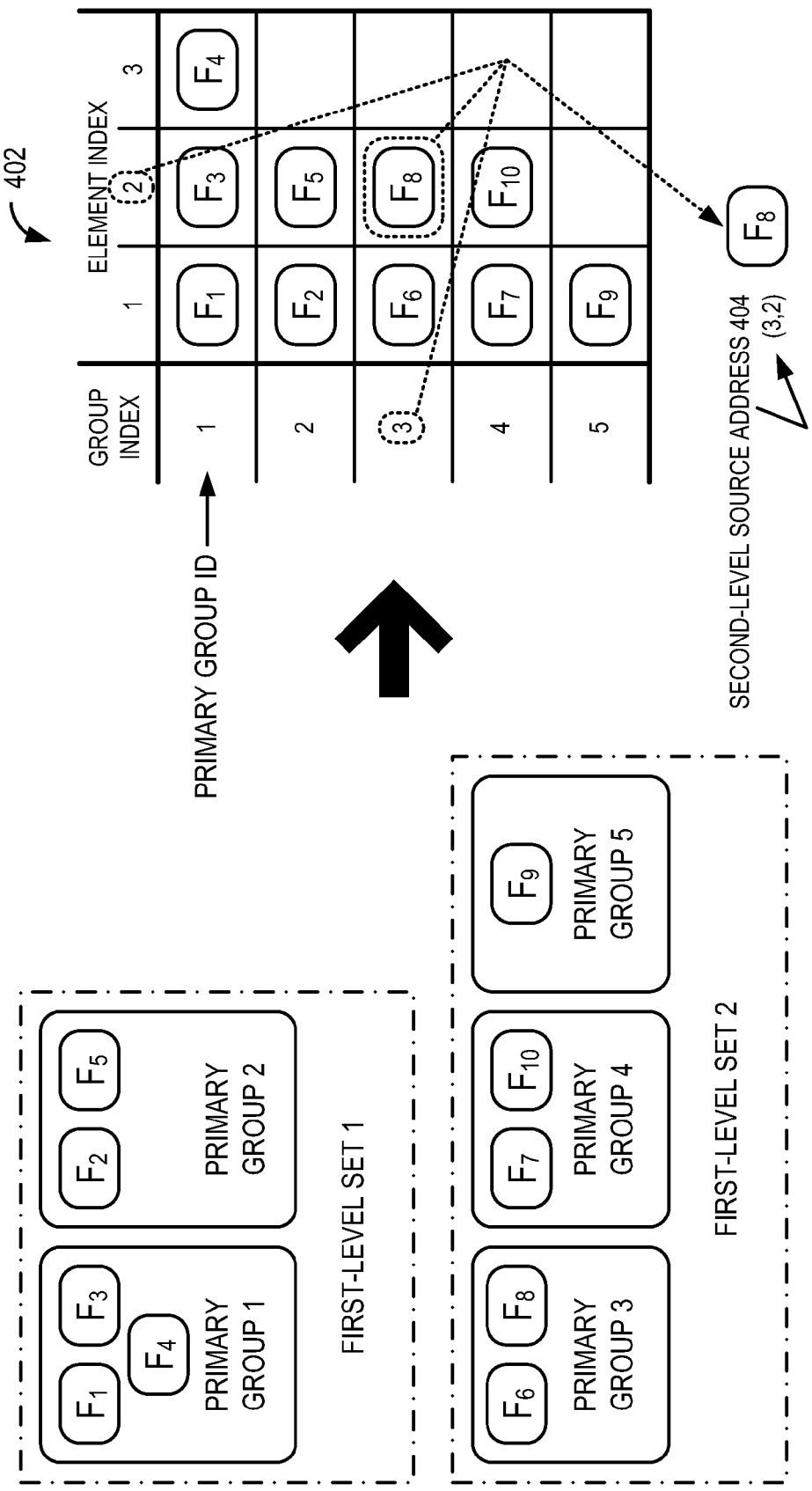
FIG. 4 schematically shows iteratively forming a plurality of second-level sets in accordance with an embodiment of the present disclosure.

FIG. 4 schematically shows an overview of an embodiment of a method of forming a plurality of second-level sets from the first-level sets shown in FIG. 3. Specifically, FIG. 4 shows a two-dimensional matrix 402 in which primary groups 1-5 are arranged, from top to bottom, in order of decreasing population. Thus, primary group 1 is shown in the first row of matrix 402 because primary group 1 includes the most elements; and primary group 5 is shown in the fifth row of matrix 402 because primary group 5 includes the fewest elements. It will be appreciated that this arrangement is shown for ease of display and description and that other suitable arrangements and approaches of forming second-level sets may be used without departing from the scope of the present disclosure.

As shown in FIG. 4, each primary group may be sequentially indexed with a group index that is different from the group index of any other primary group. Similarly, the elements of each primary group may be sequentially arranged and/or indexed. Such indexing may be conceptual and/or actual (e.g., indices of a matrix data structure). As a non-limiting example, FIG. 4 shows the groups and elements sequentially arranged in a two-dimensional matrix 402. In the matrix 402, each element of each primary group may be sequentially indexed with an element index that is different than the element index for any other element in that primary group. Accordingly, each element may be particularly identified using a second-level source address 404. For example, FIG. 4 shows face $F_8$ having a second-level source address (3, 2). The format of the second-level source address depends on the data structure(s) and/or indexing techniques used to group and/or arrange the elements. The example matrix notation of FIG. 4 is not limiting.

Second-level source address 404 may be used when sequentially selecting each next available element, running down each column (e.g., selecting from the next available primary group) until that second-level set includes the base number of elements or until no next available element remains. As used here, the next available element from the next available primary group is the element having the lowest element index and the lowest group index that has yet to be assigned to that second-level set.

Figure 5:
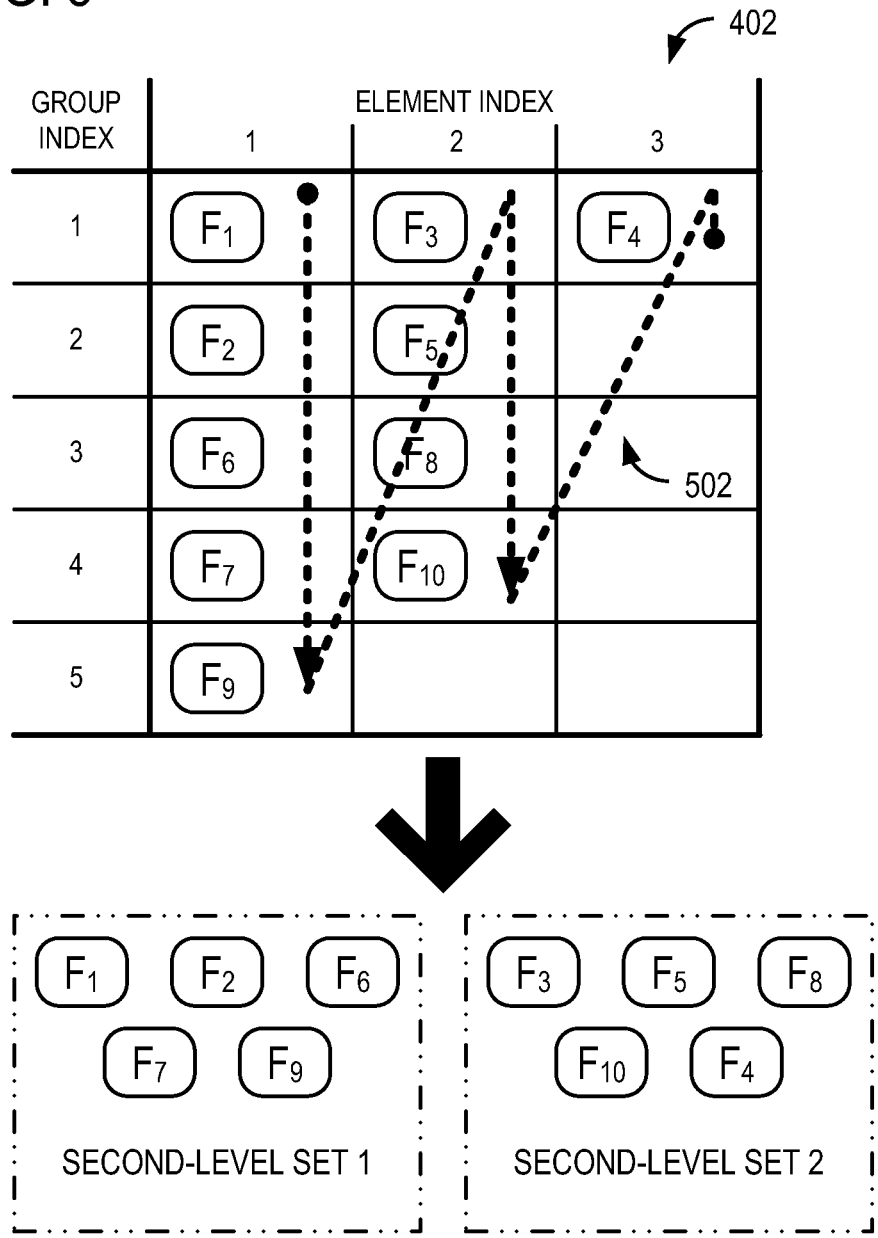
FIG. 5 schematically shows an example selection order for iteratively forming a plurality of second-level sets.

FIG. 5 schematically shows an example of such an approach. Path 502 traces the sequential selection of elements from matrix 402 when populating second-level set 1 and second-level set 2. Specifically, path 502 depicts the process of sequentially selecting a next available digital image from a next available primary group until each second-level set includes the base number of digital images or until no next available digital image remains. Thus, all but the last of the second-level sets will include the base number of the elements and the last of the second-level sets will include a remainder of the elements.

In the example shown in FIG. 5, second-level set 1 is configured to have the same base number size as the first-level sets (e.g., 5 elements), though it will be appreciated that this may vary in some embodiments. Thus, formation of second-level set 1 (according to the embodiment shown in FIG. 5) proceeds by sequential selection of faces $F_1, F_2, F_6, F_7$, and $F_9$ from matrix 402, at which point second-level set 1 has a population equal to the base number. Subsequently, second-level set 2 is formed, populated by sequential selection of faces $F_3, F_4, F_5, F_8$, and $F_{10}$.

Turning back to FIG. 1, method 100 includes, at 110, for each of the plurality of second-level sets, generating one or more secondary groups for that second-level set, each secondary group including elements from that second-level set judged to be within a second grouping tolerance of one another. Each secondary group includes elements judged to be similar to one another according to one or more predetermined characteristics. The predetermined characteristics used to judge similarity may be similar or identical to the predetermined characteristics used to form the primary groups in some embodiments. In some embodiments, the secondary groups may be formed with reference to a different set of characteristics than those used to form the primary groups.

While any suitable predetermined characteristics may be used to form the secondary groups, each secondary group includes elements from that second-level set judged to be within a second grouping tolerance of one another. It will be understood that the number of secondary groups may vary among the second-level sets. A secondary group may include all of the elements of a second-level set if all of the elements are judged to be within the second grouping tolerance of one another; a secondary group may include a plurality of elements judged to be within the second grouping tolerance of one another; or a secondary group may include a single element.

It will be understood that the second grouping tolerance and the first grouping tolerance may be identical in some embodiments, though in some other embodiments, the first and second grouping tolerances may be different without departing from the scope of the present disclosure.

Figure 6:
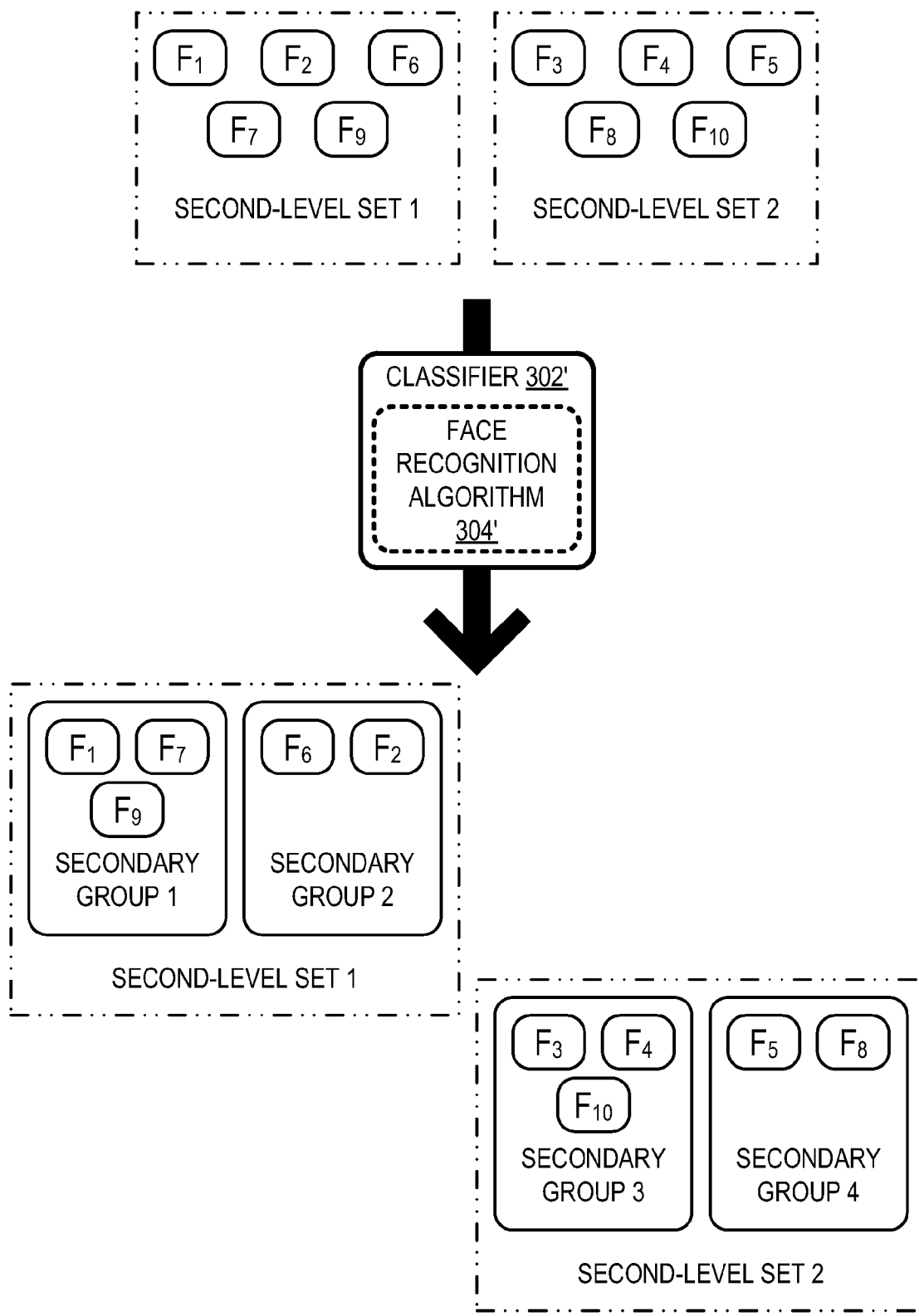
FIG. 6 schematically shows generating one or more secondary groups for the second-level sets formed in FIGS. 4 and 5.

FIG. 6 continues the example of FIG. 5, schematically showing generating one or more secondary groups for second-level set 1 and second-level set 2. Judgment regarding element similarity may be made in any suitable way, and such judgments may vary depending on the kind and type of element being classified. In the context of the face classification example, each secondary group includes digital images from that second-level set judged to be within a second grouping tolerance of one another. Thus, when classifying human faces, generating the secondary groups may include applying a face recognition algorithm to human faces depicted in digital images to judge whether a human face within one element is within the second grouping tolerance relative to a human face depicted within another element for each of the second-level sets. In some of such embodiments, the second grouping tolerance may be configured so that a pair of faces will be judged to belong to a common primary group if a face recognition algorithm (such as face recognition algorithm 304' shown in FIG. 6) judges that there is facial characteristic similarity (such as eye spacing, brow depth, etc.) between a human face depicted within one element of the pair of elements and a human face depicted within the other element of the pair of elements.

As shown in FIG. 6, classifier 302' judges whether a human face depicted within digital image (e.g., within one element) of a second-level set is within the second grouping tolerance relative to a human face depicted within another digital image of the same second-level set, so that each secondary group includes digital images from that second-level set judged to be within a second grouping tolerance of one another. Accordingly, FIG. 6 depicts the formation of secondary group 1 (including faces $F_1$, $F_7$, and $F_9$) and secondary group 2 (including faces $F_2$ and $F_6$) in second-level set 1 and the formation of secondary group 3 (including faces $F_3$, $F_4$ and $F_{10}$) and secondary group 4 (including faces $F_5$ and $F_8$) in second-level set 2.

Turning back to FIG. 1, method 100 includes, at 112, generating one or more merged groups, each merged group including all elements from one of the primary groups or secondary groups and all elements from another one of the primary groups or secondary groups. For example, each merged group of faces would include all digital images from one of the primary groups or secondary groups and all digital images from another one of the primary groups or secondary groups. As introduced above, merging the groups may reduce the overall number of groups that need direct user interaction relative to unmerged groups. Thus, merging groups of faces may reduce the number of groups that need direct human verification of face identity.

Figure 7:
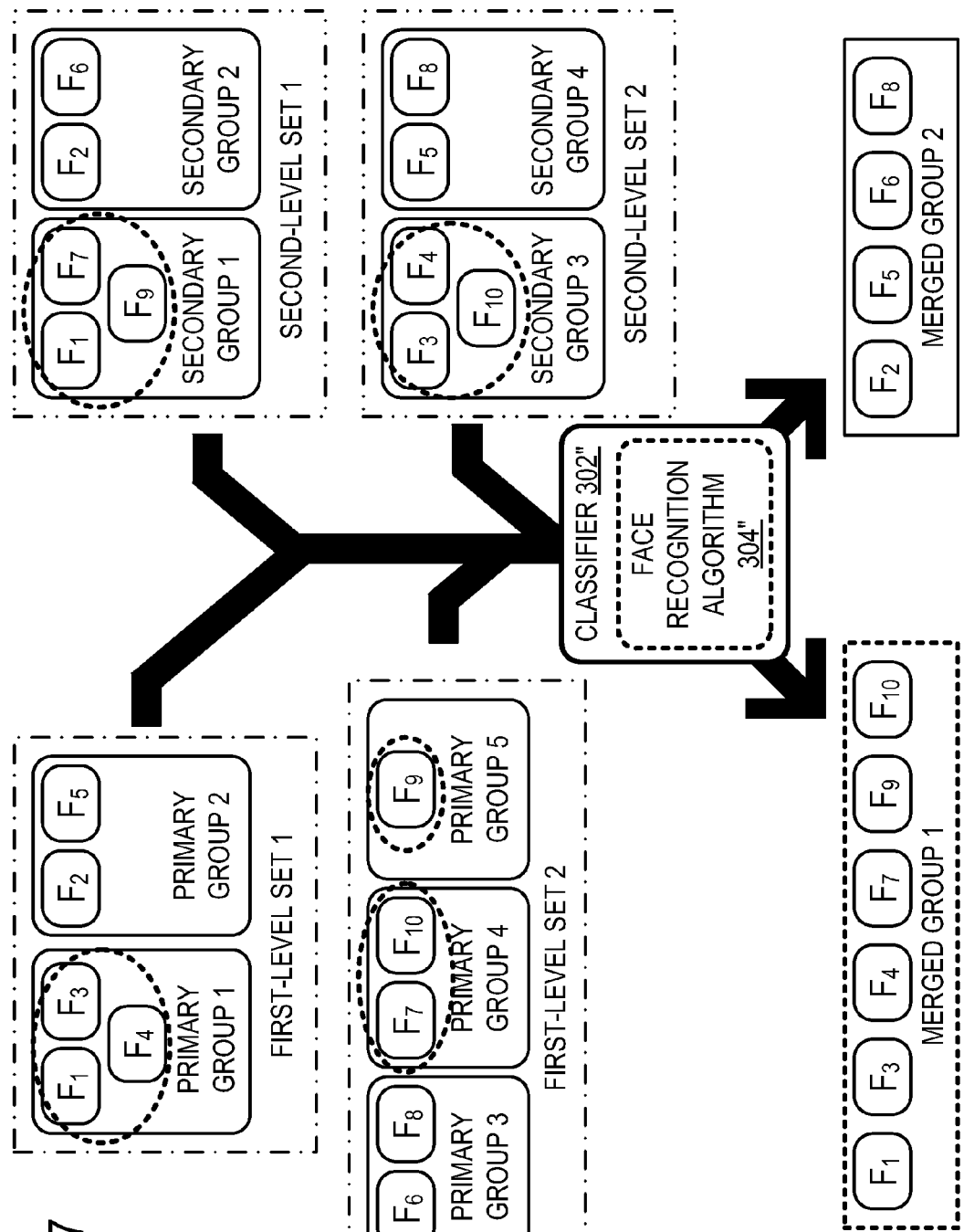
FIG. 7 schematically shows generating one or more merged groups in accordance with an embodiment of the present disclosure.

FIG. 7 schematically shows generating merged groups. In the example depicted in FIG. 7, classifier 302" (using face recognition algorithm 304") judges a degree of similarity and/or overlap of one or more facial characteristic parameters between all of the faces in each of the primary and/or secondary groups being compared when determining whether to include those faces in the merged group. Thus, as shown in FIG. 7, faces from primary group 1, primary group 4, primary group 5, secondary group 1, and secondary group 3 are all judged sufficiently similar to be included in merged group 1. Merged group 2 is formed in the same way from faces included in primary group 2, primary group 3, secondary group 2, and secondary group 4.

It will be appreciated that the factor(s) used to judge whether to merge groups may vary depending on the elements being classified and is/are not limited to the example facial characteristic parameters described above. Further, while such factors may be related to the judgment parameters described above in relation to generation of primary and secondary groups, it will be appreciated that the factors may be comparatively more or less strict. This may provide an approach for adjusting a tolerance of potential merge errors and/or an amount of direct human interaction. For example, a merged group may be generated if at least fifty percent (or another selected threshold) of the faces in a primary group and a secondary group to be merged are the same, while a merged group may be formed from groups within a first level (or a second level) set if at least twenty-five percent (or another selected threshold) of the faces in the groups to be merged are the same.

Figure 8:
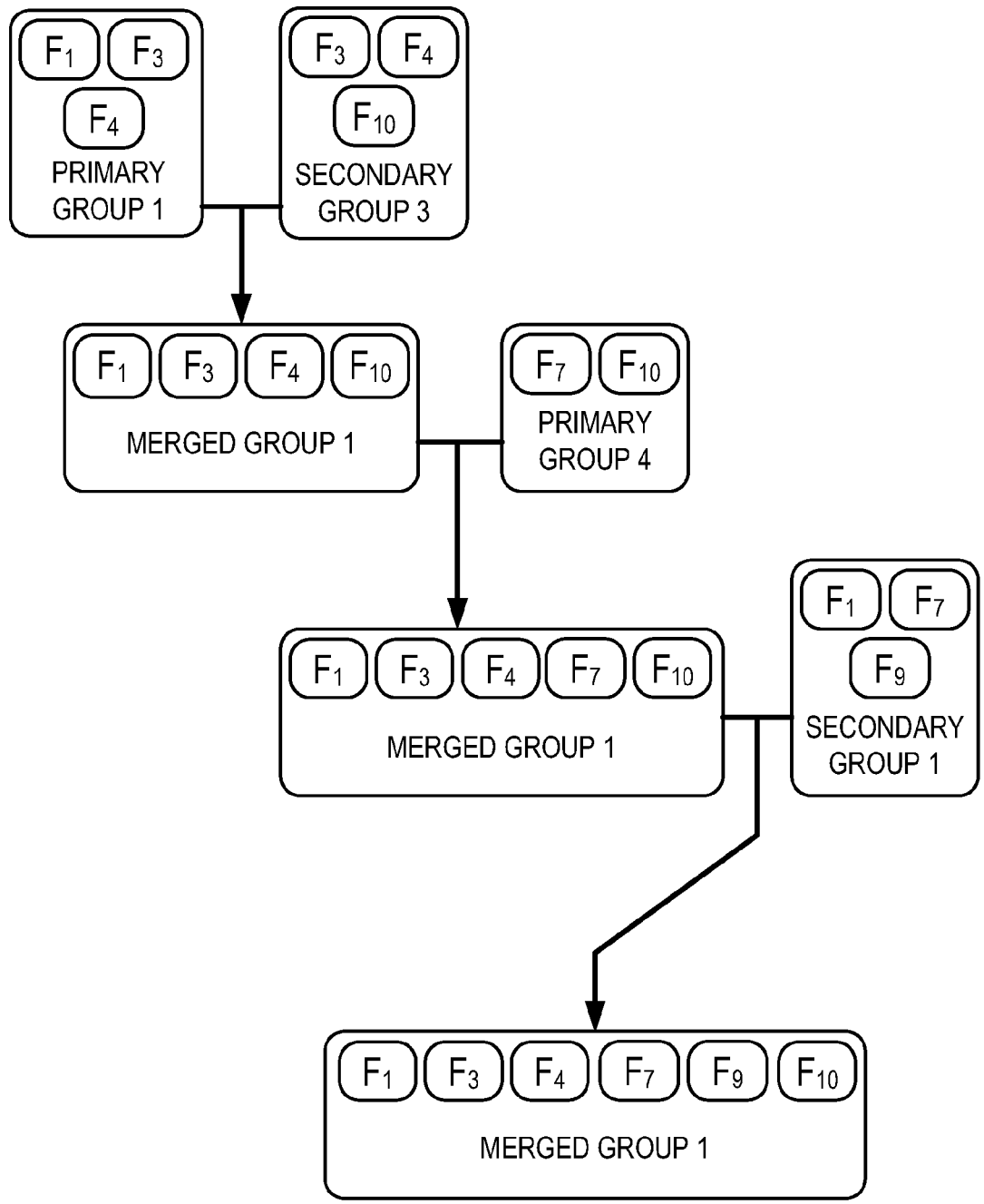
FIG. 8 schematically shows generating merged group 1 of FIG. 7 in accordance with an embodiment of the present disclosure.

As an example according to the embodiment described above, FIG. 8 schematically traces the formation of merged group 1 from FIG. 7. Initially, merged group 1 includes faces $F_1$, $F_3$, $F_4$, and $F_{10}$ from primary group 1 (faces $F_1$, $F_3$, and $F_4$) and secondary group 3 (faces $F_3$, $F_4$, and $F_{10}$), as those two groups include more than 50% overlap of faces (e.g., faces $F_3$ and $F_4$). Merged group 1 has at least a 25% overlap of faces with primary group 4 (faces $F_7$ and $F_{10}$). After merging those groups merged group 1 includes faces $F_1$, $F_3$, $F_4$, $F_7$, and $F_{10}$. Likewise, merged group 1 has at least a 25% overlap of faces with secondary group 1 (faces $F_1$, $F_7$, and $F_9$), so that, after merging with secondary group 1, merged group 1 includes faces $F_1$, $F_3$, $F_4$, $F_7$, $F_9$, and $F_{10}$. At this point, merged group 1 has less than 25% overlap with any of the primary or secondary groups, so there is not further merging of merged group 1. However, merged group 2 of FIG. 7 is formed in a similar manner.

It will be appreciated that the process of merging groups between merged groups, primary groups, and/or secondary groups may occur any suitable number of times. In the example described above, groups are merged as often as the predetermined merging criteria are satisfied (e.g., until no further merging is permitted under the criteria).

In some embodiments, once merging is completed, the resulting merged groups may be compared or otherwise checked to eliminate redundancies among the merged groups. Further, in some embodiments, all groups, including the resulting merged groups and unmerged primary and secondary groups, may be checked for faces having different representation proportions of faces (e.g., membership percentages). For example, if a particular representation proportion of a particular faces is different for different groups, the process of generating merged groups may include selectively retaining the face in the group that has the larger number of faces and eliminating the face from the other groups, so that only a single instance of the particular face is output with the merged groups after processing. For example, if $F_9$ remains in primary group 5 after merging, $F_9$ would be removed from primary group 5 (and primary group 5 would be eliminated) because merged group 1 has the larger number of faces. Where all faces are eliminated from a group, the group (primary, secondary, or merged) may be eliminated, reducing the total number of groups.

Turning back to FIG. 1, method 100 includes, at 114, receiving a classification for each of the one or more merged groups. Receipt of the classification may come from human input responsive to a prompt at a labeling device (such as a computing device configured to prepare digital video for distribution), from a request for identification to a server and/or cloud computing environment, or from any other suitable source. In the context of the face identification example described here, the classification received may include a personal identity label, such as an actor's name. Such classification may be associated with the element via metadata or another suitable mechanism.

Continuing, at 116 method 100 includes outputting the one or more merged groups. Output may be in the form of a classification library which may have any suitable organization. Non-limiting output organization schemes include temporal, alphabetical, and hierarchical schemes. In some embodiments, the output may be searchable by a user or may be configured to allow the user to navigate the classified elements. For example, once classified, the faces of actors included in content stream 202 may be organized so that a user may selectively watch a favorite performer's scenes. Thus, a user may view the development of a particular character played by a favorite actor occurring over the course of a multi-season television show as a selectively condensed version of the show.

In some embodiments, the above described methods and processes may be tied to a computing system including one or more computers. In particular, the methods and processes described herein may be implemented as a computer application, computer service, computer API, computer library, and/or other computer program product.

Figure 9:
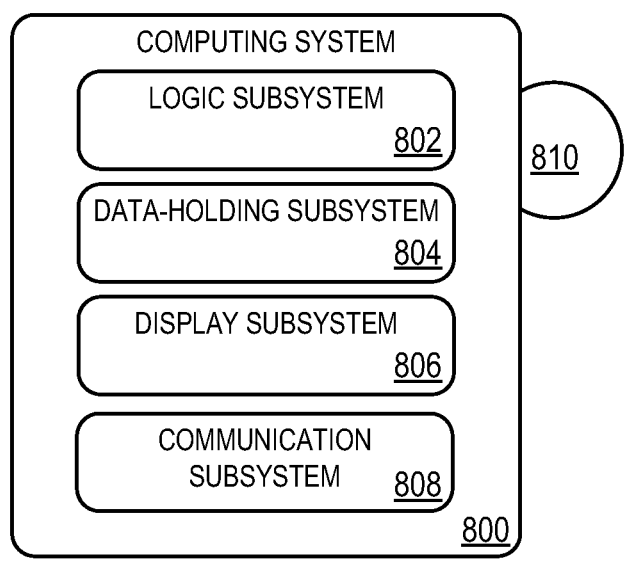
FIG. 9 schematically shows an embodiment of a classification computing device in accordance with an embodiment of the present disclosure.

FIG. 9 schematically shows a non-limiting computing system 800 that may perform one or more of the above-described methods and processes. For example, computing system 800 may be a face-labeling computing device, a classification computing device, or any other suitable computing device.

Computing system 800 is shown in simplified form. It is to be understood that virtually any computer architecture may be used without departing from the scope of this disclosure. In different embodiments, computing system 800 may take the form of a mainframe computer, server computer, desktop computer, laptop computer, tablet computer, home entertainment computer, network computing device, mobile computing device, mobile communication device, gaming device, server computing device, cloud computing environment, etc.

Computing system 800 includes a logic subsystem 802 and a data-holding subsystem 804. Computing system 800 may optionally include a display subsystem 806, communication subsystem 808, and/or other components not shown in FIG. 8. Computing system 800 may also optionally include user input devices such as keyboards, mice, game controllers, cameras, microphones, and/or touch screens, for example.

Logic subsystem 802 may include one or more physical devices configured to execute one or more instructions. For example, logic subsystem 802 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 802 may include one or more processors that are configured to execute software instructions. Additionally or alternatively, logic subsystem 802 may include one or more hardware or firmware logic machines configured to execute hardware or firmware instructions. Processors of logic subsystem 802 may be single core or multicore, and the programs executed thereon may be configured for parallel or distributed processing. Logic subsystem 802 may optionally include individual components that are distributed throughout two or more devices, which may be remotely located and/or configured for coordinated processing. One or more aspects of logic subsystem 802 may be virtualized and executed by remotely accessible networked computing devices configured in a cloud computing configuration.

Data-holding subsystem 804 may include one or more physical, non-transitory, devices configured to hold data and/or instructions executable by logic subsystem 802 to implement the herein described methods and processes. When such methods and processes are implemented, the state of data-holding subsystem 804 may be transformed (e.g., to hold different data).

Data-holding subsystem 804 may include removable media and/or built-in devices. Data-holding subsystem 804 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 804 may include devices with one or more of the following characteristics: volatile, nonvolatile, dynamic, static, read/write, read-only, random access, sequential access, location addressable, file addressable, and content addressable. In some embodiments, logic subsystem 802 and data-holding subsystem 804 may be integrated into one or more common devices, such as an application specific integrated circuit or a system on a chip.

FIG. 9 also shows an aspect of data-holding subsystem 804 in the form of removable computer-readable storage media 810, which may be used to store and/or transfer data and/or instructions executable to implement the herein described methods and processes. Removable computer-readable storage media 810 may take the form of CDs, DVDs, HD-DVDs, Blu-Ray Discs, EEPROMs, and/or floppy disks, among others.

It is to be appreciated that data-holding subsystem 804 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The embodiments of the methods described above may be performed by computing system 800 using various modules, programs, and/or engines. The terms "module," "program," and "engine" may be used to describe an aspect of computing system 800 that is implemented to perform one or more particular functions. In some cases, such a module, program, or engine may be instantiated via logic subsystem 802 executing instructions held by data-holding subsystem 804. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

When included, display subsystem 806 may be used to present a visual representation of data held by data-holding subsystem 804. As the herein described methods and processes change the data held by data-holding subsystem 804, and thus transform the state of data-holding subsystem 804, the state of display subsystem 806 may likewise be transformed to visually represent changes in the underlying data. Display subsystem 806 may include one or more display devices utilizing virtually any type of technology. Such display devices may be combined with logic subsystem 802 and/or data-holding subsystem 804 in a shared enclosure, or such display devices may be peripheral display devices.

When included, communication subsystem 808 may be configured to communicatively couple computing system 800 with one or more other computing devices. Communication subsystem 808 may include wired and/or wireless communication devices compatible with one or more different communication protocols. As non-limiting examples, the communication subsystem may be configured for communication via a wireless telephone network, a wireless local area network, a wired local area network, a wireless wide area network, a wired wide area network, etc. In some embodiments, the communication subsystem may allow computing system 800 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A data-holding subsystem comprising instructions executable by a logic subsystem of a classification computing device to:
   receive, at the classification computing device, elements for classification;
   iteratively form, at the classification computing device, a plurality of first-level sets, each first-level set including up to a base number of elements;
   for each of the plurality of first-level sets, generate, at the classification computing device, one or more primary groups for that first-level set, each primary group including elements from that first-level set judged to be within a first grouping tolerance of one another;
   iteratively form, at the classification computing device, a plurality of second-level sets by, for each second-level set, sequentially selecting a next available element from a next available primary group until that second-level set includes the base number of elements or until no next available element remains;
   for each of the plurality of second-level sets, generate, at the classification computing device, one or more secondary groups for that second-level set, each secondary group including elements from that second-level set judged to be within a second grouping tolerance of one another; and
   generate, at the classification computing device, one or more merged groups, each merged group including all elements from one of the primary groups or secondary groups and all elements from another one of the primary groups or secondary groups.

2. The data-holding subsystem of claim 1, wherein each primary group is sequentially indexed with a group index that is different from the group index of any other primary group, and wherein each element belonging to a primary group is sequentially indexed with an element index that is different than the element index for any other element in that primary group.

3. The data-holding subsystem of claim 2, wherein the next available element from the next available primary group is the element having the lowest element index and the lowest group index that has yet to be assigned to that second-level set.

4. The data-holding subsystem of claim 1, wherein all but the last of the first-level sets includes the base number of the elements, and wherein the last of the first-level sets includes a remainder of the elements.

5. The data-holding subsystem of claim 1, wherein all but the last of the second-level sets includes the base number of the elements, and wherein the last of the second-level sets includes a remainder of the elements.

6. The data-holding subsystem of claim 1, wherein the instructions to generate the primary groups for each of the first-level sets include instructions to apply a face recognition algorithm to elements in the form of digital images depicting human faces to judge whether a human face depicted within one element is within the first grouping tolerance relative to a human face depicted within another element.

7. The data-holding subsystem of claim 6, wherein the instructions to generate the secondary groups for each of the second-level sets include instructions to apply a face recognition algorithm to elements in the form of digital images depicting human faces to judge whether a human face within one element is within the second grouping tolerance relative to a human face depicted within another element.

8. The data-holding subsystem of claim 1, wherein the instructions to generate one or more merged groups include instructions to merge a primary group with a secondary group if at least fifty percent of the human faces depicted within the primary group are included within the secondary group.

9. The data-holding subsystem of claim 1, wherein the instructions to generate one or more merged groups include instructions to merge two primary groups if at least twenty-five percent of the human faces depicted within the two primary groups are the same.

10. The data-holding subsystem of claim 1, wherein the instructions to generate one or more merged groups include instructions to merge two secondary groups if at least twenty-five percent of the human faces depicted within the two secondary groups are the same.

11. The data-holding subsystem of claim 1, wherein the instructions to generate one or merged groups include instructions to eliminate redundant groups and to eliminate a particular face from a particular group if the particular face has a different representation proportion in a plurality of groups.

12. A face-labeling computing device, comprising:
a data-holding subsystem comprising instructions executable by a logic subsystem of the face-labeling computing device to:
receive, at the face-labeling computing device, faces to be labeled according to personal identity,
iteratively form, at the face-labeling computing device, a plurality of first-level sets, each first-level set including up to a base number of digital images, each digital image depicting a human face,
for each of the plurality of first-level sets, generate, at the face-labeling computing device, one or more primary groups for that first-level set, each primary group including digital images from that first-level set judged to be within a first grouping tolerance of one another,
iteratively form, at the face-labeling computing device, a plurality of second-level sets by, for each second-level set, sequentially selecting a next available digital image from a next available primary group until that second-level set includes the base number of digital images or until no next available digital image remains,
for each of the plurality of second-level sets, generate, at the face-labeling computing device, one or more secondary groups for that second-level set, each secondary group including digital images from that second-level set judged to be within a second grouping tolerance of one another, and
generate, at the face-labeling computing device, one or more merged groups, each merged group including all digital images from one of the primary groups or secondary groups and all digital images from another one of the primary groups or secondary groups.

13. The face-labeling computing device of claim 12, further comprising instructions to receive a personal identity label for each of the one or more merged groups.

14. The face-labeling computing device of claim 12, wherein each primary group is sequentially indexed with a group index that is different from the group index of any other primary group.

15. The face-labeling computing device of claim 14, wherein each digital image belonging to a primary group is sequentially indexed with an element index that is different than the element index for any other digital image in that primary group.

16. The face-labeling computing device of claim 15, wherein the next available digital image from the next available primary group is the element having the lowest element index and the lowest group index that has yet to be assigned to that second-level set.

17. A method for classifying elements into groups by identity, the method comprising:
receiving, at a classification computing device, elements for classification;
iteratively forming, at the classification computing device, a plurality of first-level sets, all first-level sets but a last first-level set including a base number of elements, the last first-level set including a remainder of elements;
for each of the plurality of first-level sets, generating, at the classification computing device, one or more primary groups for that first-level set, each primary group including elements from that first-level set judged to be within a first grouping tolerance of one another;
iteratively forming, at the classification computing device, a plurality of second-level sets by, for each second-level set, sequentially selecting a next available element from a next available primary group until that second-level set includes the base number of elements or until no next available element remains, all second-level sets but a last second-level set including the base number of elements, the last second-level set including a remainder of elements;
for each of the plurality of second-level sets, generating, at the classification computing device, one or more secondary groups for that second-level set, each secondary group including elements from that second-level set judged to be within the first grouping tolerance of one another;
generating, at the classification computing device, one or more merged groups, each merged group including all elements from one of the primary groups or secondary groups and all elements from another one of the primary groups or secondary groups if all of the elements included in the one of the primary groups or secondary groups and the another one of the primary groups or secondary groups are judged to be within a second grouping tolerance of one another; and
receiving, at the classification computing device, an identity label for each of the one or more merged groups.

18. The method of claim 17, wherein each primary group is sequentially indexed with a group index that is different from the group index of any other primary group, wherein each element belonging to a primary group is sequentially indexed with an element index that is different than the element index for any other element in that primary group, and wherein the next available element from the next available primary group is the element having the lowest element index and the lowest group index that has yet to be assigned to that second-level set.

19. The method of claim 17, wherein generating the primary groups for each of the first-level sets includes applying a face recognition algorithm to elements in the form of digital images depicting human faces to judge whether a human face depicted within one element is within the first grouping tolerance relative to a human face depicted within another element, and wherein generating the secondary groups for each of the second-level sets includes applying a face recognition algorithm to elements in the form of digital images depicting human faces to judge whether a human face within one element is within the second grouping tolerance relative to a human face depicted within another element.

20. The method of claim 17, wherein generating one or more merged groups includes:
- merging a primary group with a secondary group if at least fifty percent of the human faces depicted within the primary group are included within the secondary group;
- merging two primary groups if at least twenty-five percent of the human faces depicted within the two primary groups are the same;
- merging two secondary groups if at least twenty-five percent of the human faces depicted within the two secondary groups are the same;
- eliminating redundant groups; and
- eliminating a particular face from a particular group if the particular face has a different representation proportion of faces in a plurality of groups.

\* \* \* \* \*